May 17, 1960 T. N. CUMMINGS ET AL 2,936,798
PACKAGING MACHINE FOR FLOWABLE MATERIAL
Filed Sept. 10, 1953 7 Sheets-Sheet 3

INVENTORS.
Thomas N. Cummings
Benjamin R. Peterson, Jr.
Thomas R. Shiu
By
Atty.

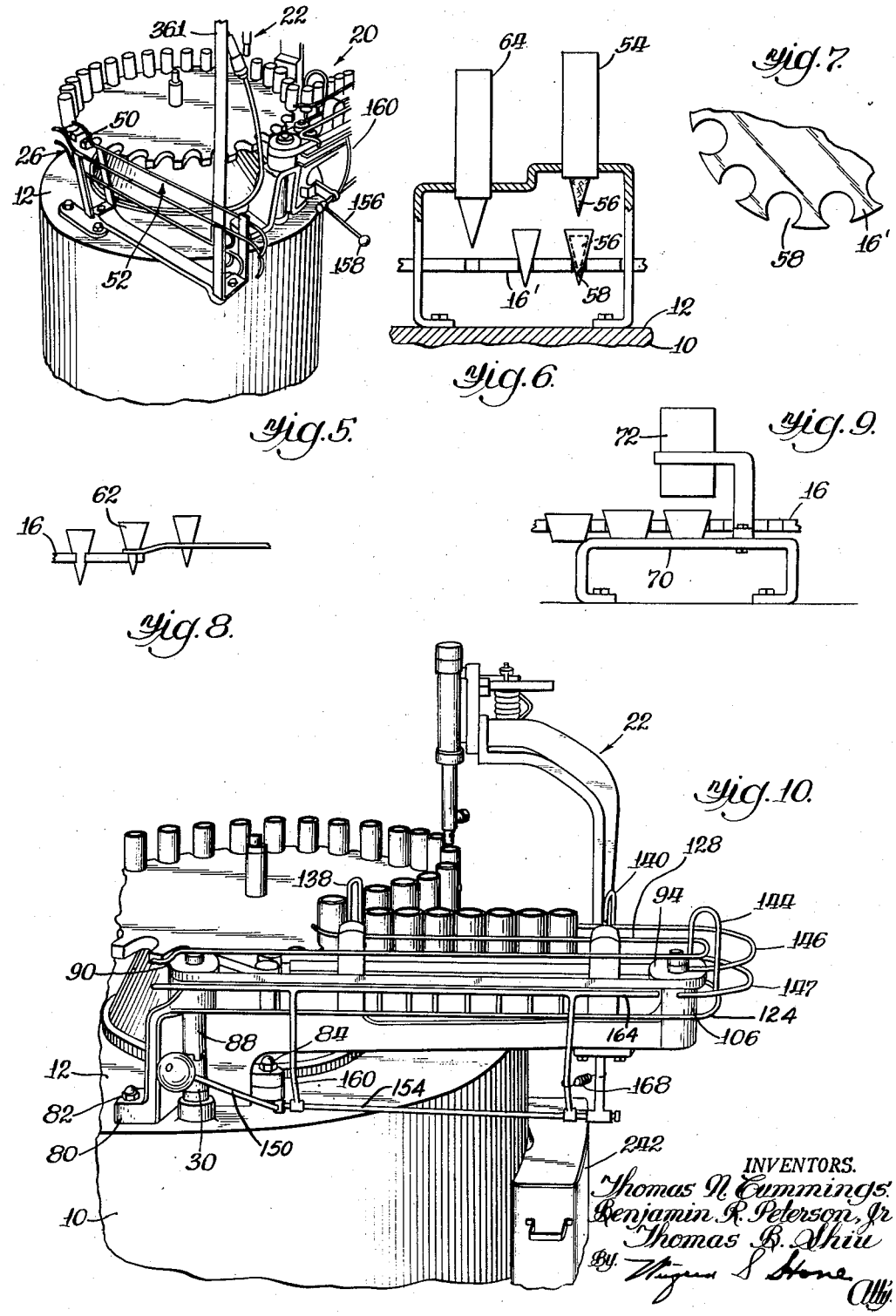

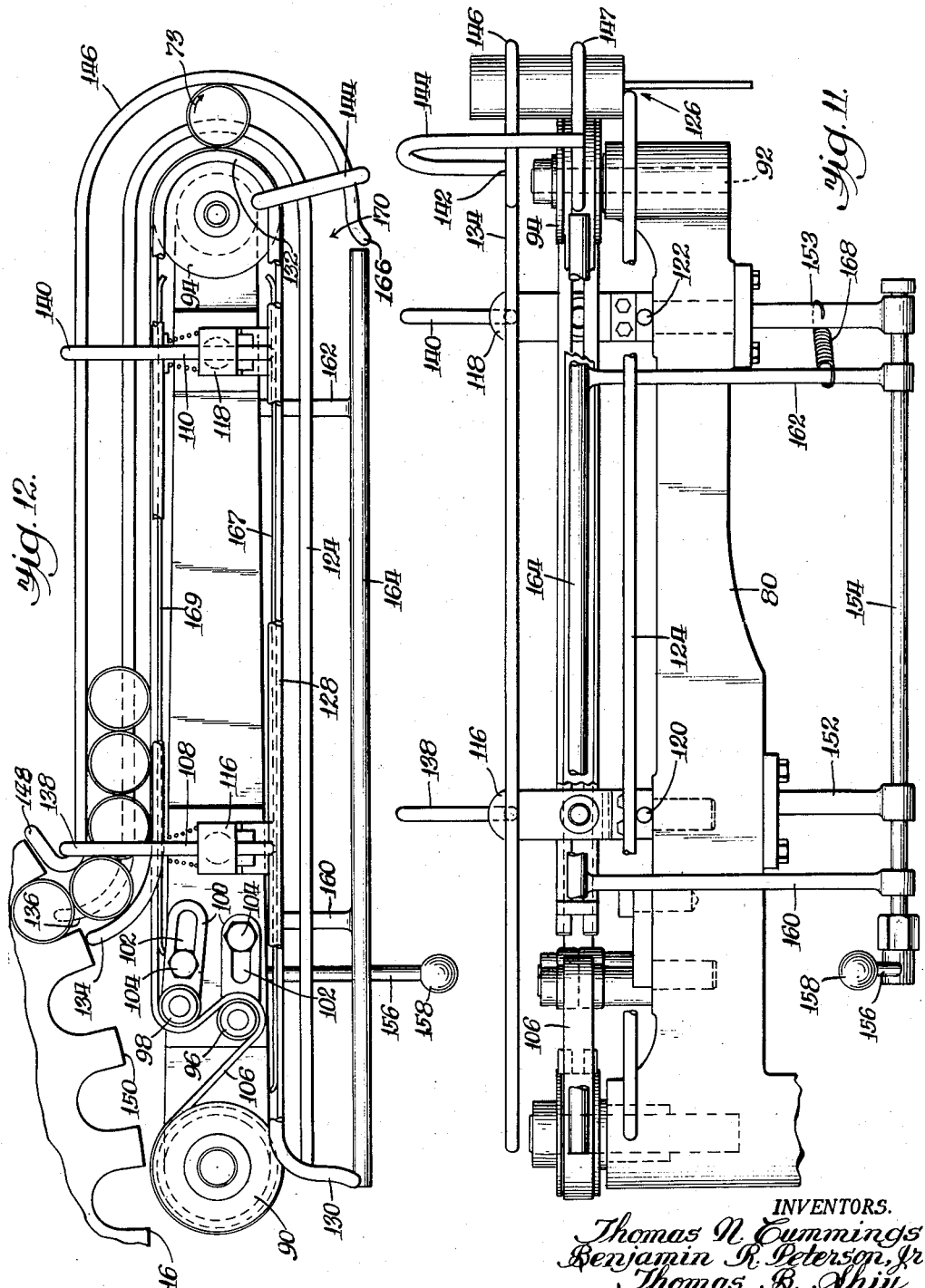

May 17, 1960 T. N. CUMMINGS ET AL 2,936,798
PACKAGING MACHINE FOR FLOWABLE MATERIAL
Filed Sept. 10, 1953 7 Sheets-Sheet 6
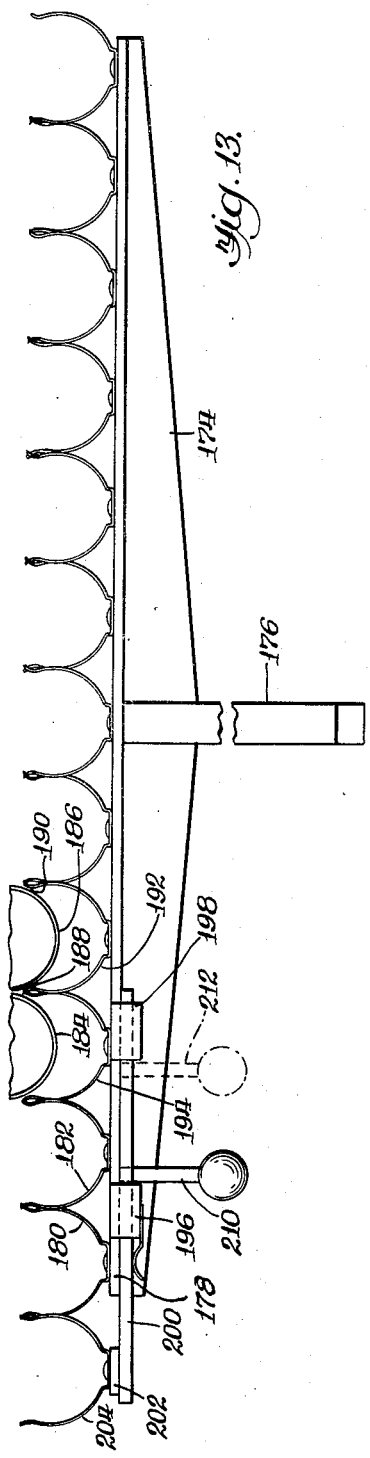
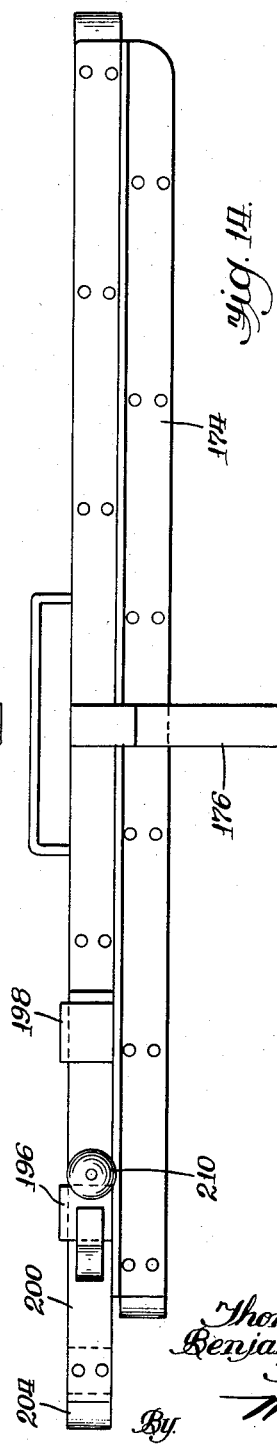
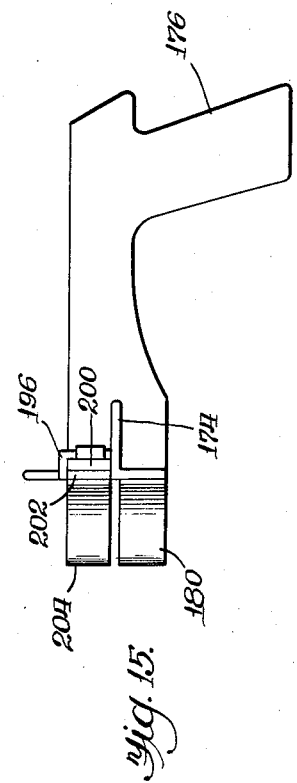
INVENTORS.
Thomas N. Cummings
Benjamin R. Peterson, Jr.
Thomas B. Shiu
By
Atty.

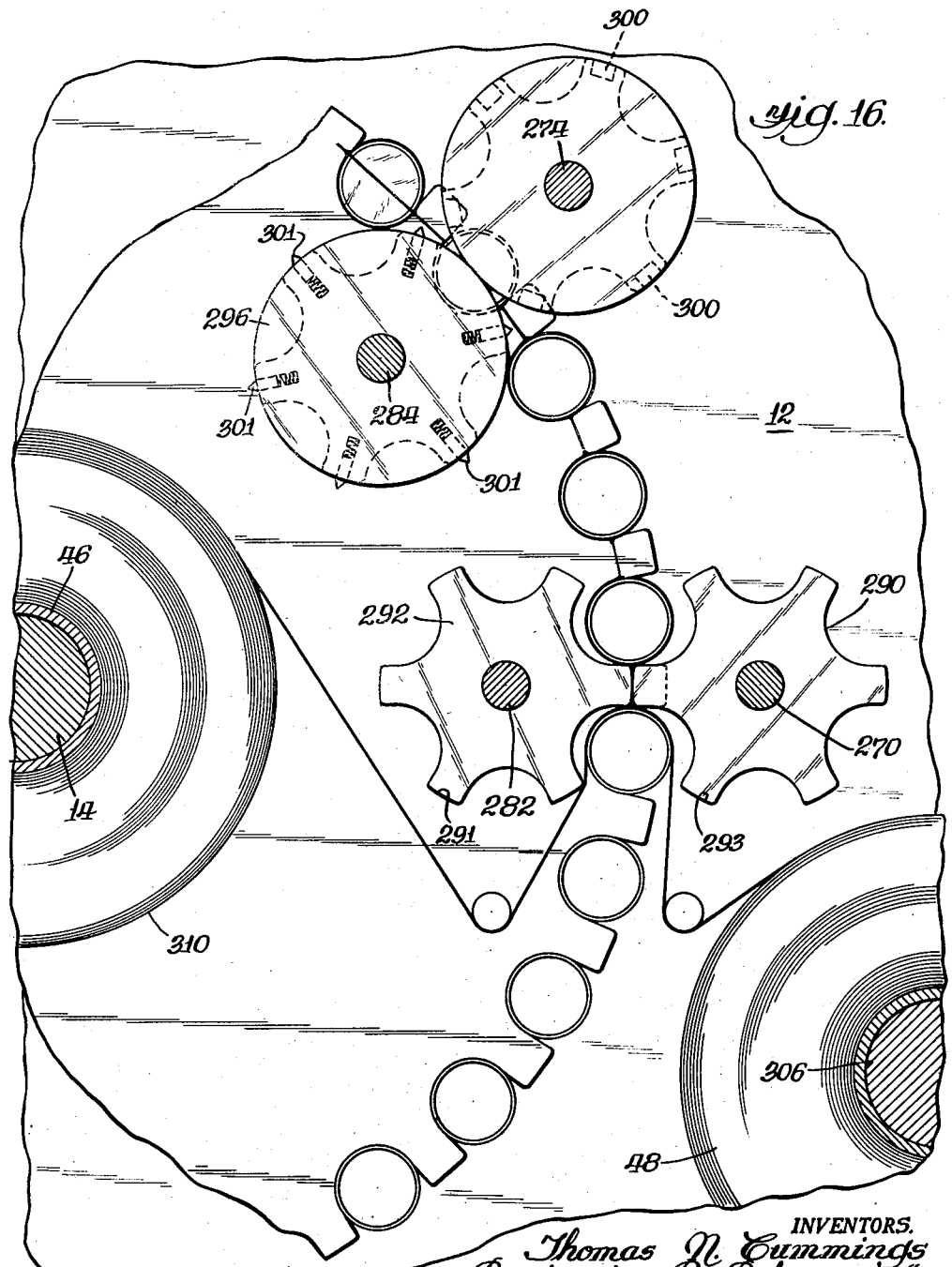

United States Patent Office 2,936,798
Patented May 17, 1960

2,936,798

PACKAGING MACHINE FOR FLOWABLE MATERIAL

Thomas N. Cummings, Chicago, Benjamin R. Peterson, Jr., Wheaton, and Thomas B. Shiu, Chicago, Ill., assignors, by direct and mesne assignments, to CPS Manufacturing Company, Chicago, Ill., a corporation of Illinois Application September 10, 1953, Serial No. 379,332

3 Claims. (Cl. 141—88)

This invention relates to a machine for packaging flowable material in erected containers of various sizes and shapes, and particularly to a machine for packaging ice cream. It additionally relates to a method of transferring erected cartons from a shipping container to an ice cream filling machine, and to apparatus for performing this operation.

In the United States, the demand for ice cream is steadily moving away from ice cream in bulk, that is, from ice cream in two and one-half to ten gallon containers. The demand is increasing for packaged ice cream in a single serving quantity, i.e., cones, popsicles, pushups, ice cream bars, quarter-pint malted milk portions, etc. Both soda fountain and home are showing a preference for a single serving whose wrapper is discarded upon removal from the refrigerator and no part of which is returned to the refrigerator. In the not distant future, the quantity of ice cream for a sundae or a soda may be individually wrapped. The housewife is a preference for single serving packages because this avoids spooning from the pint or quart containers and avoids returning partially empty containers to the refrigerator. The preference is to take only so much ice cream out of the refrigerator as will be immediately consumed. The ice cream industry is in a transition period between bulk production and individual serving production.

The principal object of this invention is to provide an ice cream packaging machine which can fill containers of various shapes ranging in size from an individual portion, i.e., one-quarter to one-third pint, to quarts. Applicants seek to provide ice cream packers with a single unit which will meet the demands of the market for various ice cream packages. The problem has elements of simplicity and of difficulty. According to present practice, ice cream can be extruded from mixing and freezing equipment at a wide range of viscosities and it would, therefore, appear that from the standpoint of the ice cream itself, it could be pushed into any kind of a container with equal ease. However, the containers themselves must be held during the filling and the closing processes. So varied are their shapes that today one machine is used to fill Dixie cups, another ice cream cones, and so on. The equipment is expensive. The result is that small ice cream processors have one machine and not another, and those that have all machines find them standing idle for substantial periods of time.

The first feature of applicants' invention is the provision of a plurality of loading tables, each interchangeably mountable on the same driving frame and each adapted to hold a plurality of one type of container around its periphery. The holding means around a loading table for containers having flexible side walls are notches having a diameter slightly less than that of the containers. Those on a loading table for rigid walled containers are spring clips. Those on a loading table for conical containers are semi-circular notches. Around the periphery of the table are removably mounted, all on the same frame and all deriving power from one source, a plurality of operating stations, one for positioning the containers on the table, another for filling the containers, a third for wrapping or closing the containers, and a fourth for removing the containers from the loading table. The equipment at each station is removable so that an ice cream manufacturer can change from filling pushups to filling ice cream cones or Dixie cups with a minimum of difficulty and time. By changing the loading table and a drive cam, and by mounting at the respective stations the loading, filling, etc., equipment required by a specific container, he can fill automatically whatever erected container he will. His investment in these operating station attachments is substantially less than in separate machines, and by combining public demand for various types of packaged ice cream, he is better able to keep his machine in full time operation. Applicants' machine is a single unit on casters. It may be rolled on a floor adjacent a mixer, or in the case of ice cream, adjacent a freezer which is a machine fixed to the floor.

An important feature of the machine resides in the fact that the space above the loading table is clear so that attachments mounted on the frame and at one side of the table may extend over the table in order to perform their functions.

A second general object of this invention is to relate the loading of an erected container filling machine to the form in which erected containers are received from the carton manufacturer. In explanation, this invention is not concerned with the packaging of ice cream, comestibles or other products in cartons which at the time of packaging are in flat form. It relates to filling containers which at the time of packaging are in erected form. In the ice cream business, these include ice cream cones, pushups, Dixie cups, and cylindrical pint and quart containers. These containers are usually not made by the ice cream manufacturers but are received in erected form. They arrive at the ice cream packer's plant in large shipping containers. If the containers are conical such as cones or Dixie cups, they are nested and they can be dispensed one at a time from the bottom of a stack into the filling machine. If, on the other hand, their cross setion is constant as in the case of pushups or cylindrical pint and quart containers, the shipping containers received from the carton manufacturer are side by side. Each container can be individually picked up.

Herein lies one problem which applicants seek to overcome, they are individually picked up. This is slow. A feature of applicants' invention is the provision of a device for picking up an entire row of such non-nestable containers as they lie in the shipping container received from the carton manufacturer, and the provision of a loading station on the ice cream filling machine which will receive a complete row of such containers. The ice cream apparatus disclosed relates principally to pushups and discloses a gun which picks up twelve or thirteen pushups from the shipping container of pushups so that the entire row may be loaded in the filling machine by a simple manual operation. In this connection, applicants provide an assemblage for loading the containers onto a central or loading table which makes possible the steady feeding of the pushups onto the table although the containers are inserted into the loading mechanism at irregular intervals of time.

Inasmuch as the machine is a multi-purpose machine, applicants show in the specification the apparatus used for filling pushups only. Additionally, applicants suggest forms of feeding, wrapping and capping assemblages for use in connection with other types of erected containers such as cones, Dixie cups and the like.

Another object of the invention is to provide a removable filling station which, however, will be usable for all types of erected containers to be filled with flowable material. A feature of the invention is the provision of a mounting for the ice cream nozzle which may be easily raised and lowered with respect to the loading table. In connection with this filling station, applicants provide a duct which permits the extrusion of ice cream while the machine is not operating until the ice cream is flowing at the proper consistency, and which delivers the ice cream to the catch pan so that the ice cream may be reprocessed.

Another object of this invention is to provide a removable assemblage at the wrapping station which will close the top of pushups or filled ice cream cones within a heat-sealable material such as wax paper. Applicants illustrate the mounting for a Dixie cup capper at the wrapping station.

Another object of this invention is to provide a simple means of removing the filled containers from the loading table. In connection with holding elements for the containers, applicants provide an apparatus which cams the containers out of the holding means and holds them in a straight line until the operator can transfer them to a package.

The foregoing objects and features are usable for packaging materials other than semi-frozen ice cream in erected containers. If the containers are flexible as are cardboard containers, the rigid notches in the periphery of the loading table satisfactorily hold the containers by slightly deforming them. If the containers are rigid, flexible slips such as shown on applicants' loading gun may be mounted on the periphery of the table. Applicants' machine, however, is primarily directed to the ice cream field and underlining the design of any machine for that field are the requirements of easy cleaning and protection of the motive power and gear trains from water. Ice cream plants are thoroughly cleaned every 24 hours, commonly with hoses, and apparatus should be movable if possible and water splashing from the floors should not reach motors and gear trains. A feature of applicants' invention is the provision of a cylindrical housing having a water-tight top excepting for a large central opening which gives access to a drive linkage carrying an interchangeable cam, and excepting for projecting shafts connected to the source of power. Another feature is the mounting of all controls in a box supported centrally above the machine. This box contains switches for starting and stopping the machine, controlling the heating elements for the heat sealers and the like. There are other features which appear in the disclosure that follows.

These and such other objects as may hereinafter appear are attained in the embodiment of the invention shown in the accompanying drawings wherein:

Fig. 5 is a perspective view of the delivery station with the feeding and filling stations shown only partially;

Fig. 6 is a front elevation partly in section and generally schematic of a loading station for ice cream cones;

Fig. 7 is a plan fragmentary view of a loading table for ice cream cones, showing the plan configuration of the notches in the loading table;

Fig. 8 is a schematic illustration showing how cones are cammed out of the notches in a loading table;

Fig. 9 is a schematic side elevation of a lid capper for Dixie cups;

Fig. 10 is a perspective of the loading station and feed assemblage for pushups;

Figs. 11 and 12 are side elevation and plan views respectively of the pushup loading station shown in Fig. 10;

Figs. 13, 14 and 15 are plan, rear and end elevations of applicants' pushup loader gun shown in perspective at the left-hand side of the machine in Fig. 1;

Fig. 16 is a view taken on the line 16—16 of Fig. 4; and,

Fig. 17 is a vertical sectional view of the delivery end of applicants' ice cream nozzle.

*General description of applicants' apparatus equipped to fill cylindrical containers*

Figure 1:
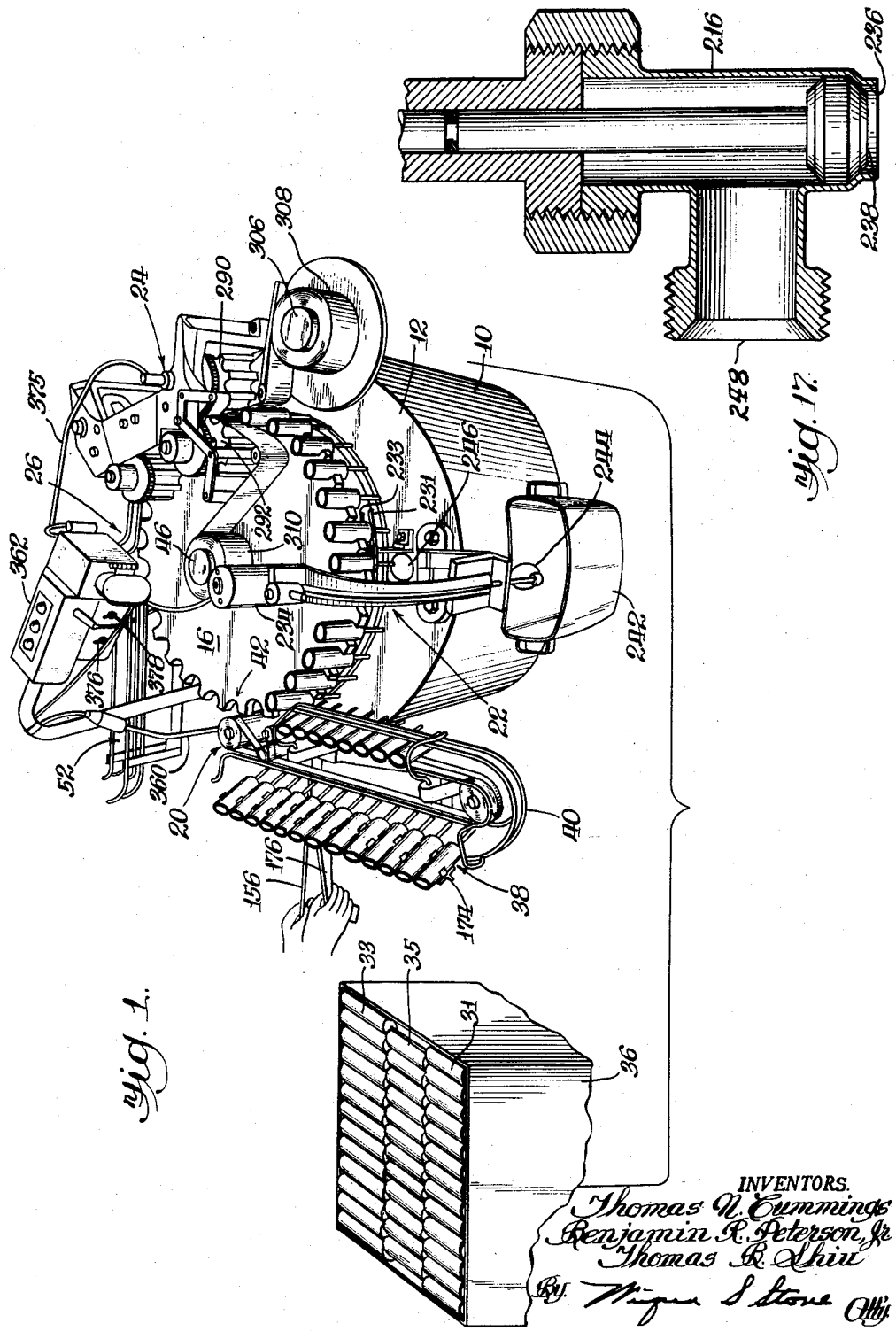
Fig. 1 is a perspective view taken from above of applicants' ice cream filling machine with a shipping container of pushups positioned adjacent the loading station.

Referring to Fig. 1, the motive power of applicants' machine is housed in a vertical, cylindrical tank or housing 10 having a top 12 welded to the upper periphery of the tank. This tank is of heavy construction and is supported on casters which cannot be seen. Concentrically of the center of this top is a large circular opening having a diameter slightly less than the inverted bowl 18 which prevents water from entering the housing 10, see also Fig. 3. Projecting upwardly through the opening and through a central hole in the bowl 18 is a vertical shaft 14, on the upper end of which is mounted a loading table 16.

Returning to Fig. 1, around the top 12, spaced 90° apart, are four operating stations, namely: a container loading station or assemblage 20, an ice cream loading station or assemblage 22, a wrapping station or assemblage 24, and an unloading station or assemblage 26. Two of these stations require power, namely, the container loading station 20 and the wrapping station 24, see also Fig. 2.

Figure 2:
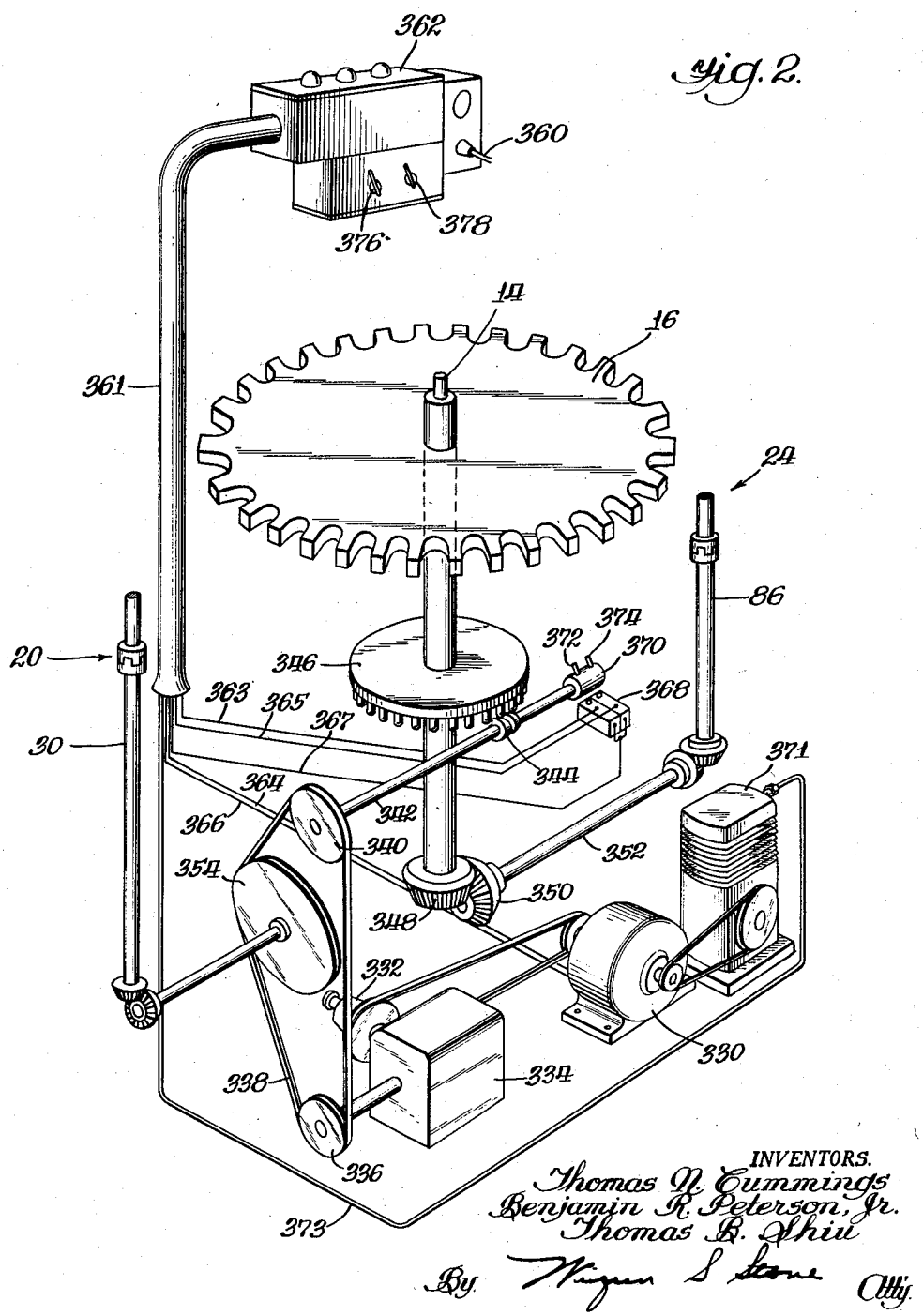
Fig. 2 is a schematic perspective view of the power trains within applicants' housing.
Figure 3:
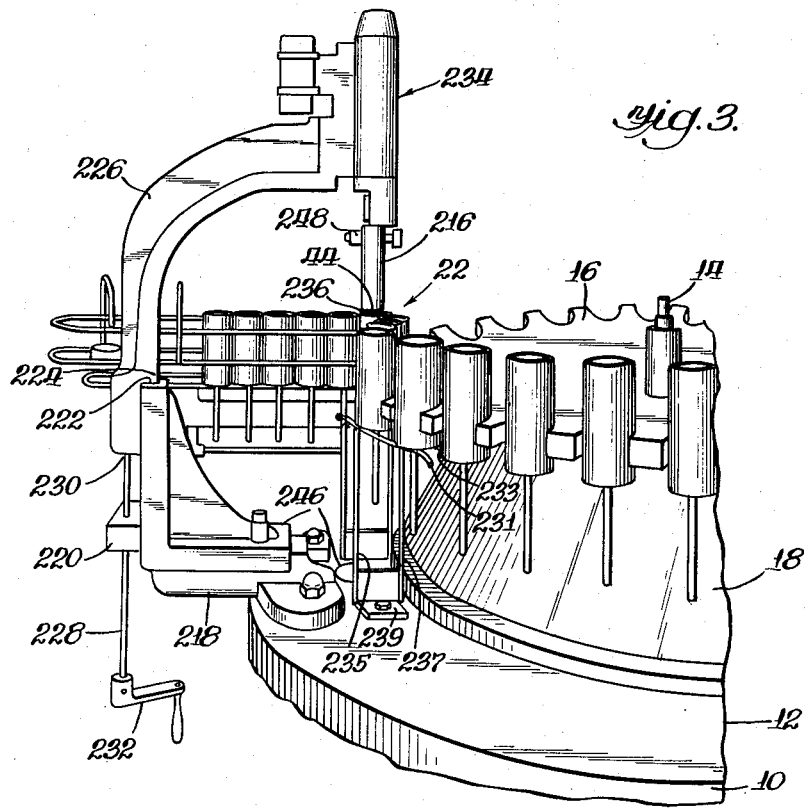
Fig. 3 is a side perspective view of the ice cream filling station for pushups.
Figure 4:
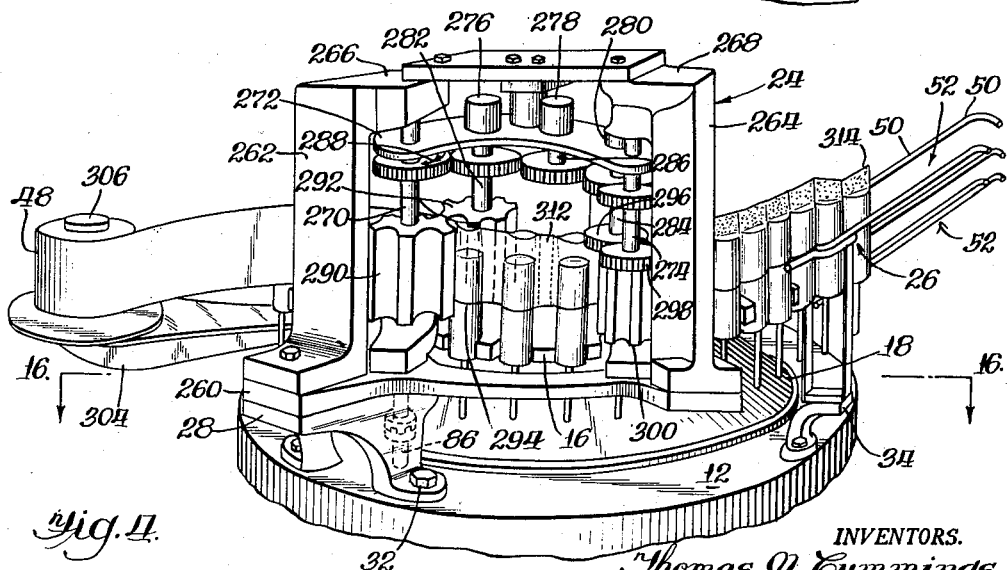
Fig. 4 is a front perspective view of the wrapping station for pushups.

In order to supply the power, there extends upwardly through the top 12 of the housing 10 two vertical shafts 30 and 86 one at each station, see also Fig. 2. These shafts which may be coupled to removable assemblages for performing at the station the particular operation necessary for a particular type of container. By referring to Figs. 1, 10, 3, 4 and 5, each of the operating elements that function in conjunction with the loading table 16 are seen to be separate units bolted to the table 12. Referring to Fig. 4, for example, the wrapping station 24 is an assemblage mounted on a bracket 28 which is centered over a stub shaft 86 deriving power from inside the housing 10. The bracket 28 is held in position by nuts and bolts such as 32. In this same view may be seen the bracket 34 which holds the delivery station 26. Thus, for purposes of cleaning or obtaining access to the power elements located beneath the removable inverted bowl 18, all of the operating stations can be lifted clear of the cylindrical housing 10. Again, referring to Fig. 4, the wrapping station has several moving parts, all of which, however, are driven from the single shaft 86.

Importantly, the space of the table 16 is clear. Referring to Fig. 1, the control box is a full fifteen inches above the top of the shaft 14. The operating assemblages, therefore, can have parts which overhang the table. The diameter of the table 16 is substantially smaller than that of the housing top 18, thereby providing an annular circular shelf upon which may be easily and firmly mounted the heavy operating assemblages.

This arrangement of vertical shafts spaced around a central loading or work table provides the means of quickly changing the machine from a pushup loader to an ice cream cone loader, or a Dixie cup loader. It facilitates quick cleaning.

Referring to Fig. 1, the numeral 36 identifies a shipping container filled with pushups as they come from the carton manufacturer. The pushups are lying in several rows, 13 in rows 31 and 33 and 12 in row 35. The sticks of one row lie between the containers of an adjacent row. A pushup is a cardboard container having a bottom fastened to one end of a stick so that by pushing up the stick, the contents of the container may be pushed out of the top. The loading operator applies a pushup holder to an entire row, picking up the complete row at one time, and places them adjacent the container loading station, as at 38. This station moves the pushups around the curve 40 where they are successively pressed into a circumferential row of notches 42 in the periphery of the loading table 16. These notches are U-shaped, see also Fig. 12, and the spacing of the arms of each notch is slightly less than the outside diameter of a pushup so that the pushup is slightly deformed, but this deformation results in the pushups being securely held. As can be seen in Fig. 3, the sticks on the pushups hang free and clear.

The loader table moves intermittently, by 12° of arc, around the shaft 14. The notches 42, therefore, are on 12° centers. As each pushup passes beneath a nozzle 44, see also Fig. 3, of the ice cream filling station 22, a pushup is filled with soft ice cream. As the loader table 16 continues to rotate, the pushups reach the wrapping station 24, see also Fig. 4. At this station, two rolls of heat-sealable material 46 and 308 on vertical axes feed a strip of heat-sealable material adjacent opposite sides of the advancing pushups. In an apparatus hereinafter more specifically described, the top of each pushup is closed with a moisture-proof wrapper.

The pushups continue to advance until they reach the unloading station 26. Referring to Figs. 4 and 5, an arm 50 cams each pushup into a runway 52. An operator draws the pushups off the end of the unloading runway and packs them in a box and thence they are taken to a hardening room.

The arrangement described is usable for the filling of all containers which do not nest, and which have slightly flexible side walls. If it is desired to fill the standard cylindrical pint or quart containers, all that is necessary is to remove the four operating assemblages shown at the four stations in Fig. 1, the loader table, and a cam in the drive linkage, and replace these elements with very similar elements capable, however, of handling the particular diameter of the cylindrical container. Thus, assuming that one wishes to load cylindrical pint containers, the runway at the loading station will have a diameter capable of holding such containers with their axes vertical, and they will appear in the machine in much the way shown in the perspective views of the present drawings. The holding notches on the loading table will be larger, but they will be on centers which are a multiple of 12°. The ice cream loading station, which is electrically actuated, as will be hereinafter described, will be timed to fill such containers. Usually such containers are not wrapped and a special capping station may replace the wrapping station 24. The containers may be peeled off to the loading table by an unloading runway similar to the one shown in Fig. 2.

Where the containers are rectangular parallelepipeds, which have become very popular in their small one-serving form, applicants' machine can be adapted to load them if they are pre-erected. At the present time, such containers are loaded in a machine which erects the containers from flat form immediately before filling. Suffice it to say, the elements of applicants' apparatus can be readily provided to handle any kind of a container whose vertical cross section is constant and whose side walls are capable of slight squeezing.

Where the containers have rigid side walls, cuplike holders or clips replace the notches as the container-holding means around the periphery of the table. Modified notches are hereinafter described in connection with cones and Dixie cups.

The means for varying the movement of the loading table to correspond with the spacing of the notches in the loading table is illustrated in the schematic perspective, Fig. 2. Referring to that figure, a motor 330 through a variable speed control 332, a gear reducer 334, a pulley 336, and a belt 338, drives the pulley 340 and a shaft 342. Removably mounted on the shaft 342 is a worm cam 344 which drives a modified gear 346 on the main shaft 14. One turn of the shaft 342 rotates the shaft 14 by twelve degrees. All of this equipment is within the cylindrical housing 10. Mounted above the top 12 of the cylindrical housing 10 is the loading table 16, as heretofore described. Mounted on the lower end of the shaft 14 is a beveled gear 348 which through a complementary gear 350 rotates a shaft 352. The shaft 352 turns the shaft 86 intermittently with the turning of the table 16. Shaft 86 functions the wrapping mechanism, see Fig. 4.

Also turned by the belt 338 is a pulley 354 which through beveled gears continuously turns the shaft 30, which drives the feeding assemblage, see Fig. 10. Where the table 16 is replaced by one in which the notches or container-holding means are spaced twice as far apart, the cam 344 is replaced by a cam which will turn the modified gear 346 by twice the number of degrees of arc. As long as the centers of the holding means are spaced by a multiple of 12° of arc, all that is necessary to load different diameter containers is to substitute an appropriate loading table and cam.

*The electric controls*

The electric controls and circuits need be described only generally. All electrical power is delivered to the machine through a cable 360, see Fig. 1, which leads to a control box 362 supported on an arm 361 mounted on the housing 10. The main circuit, controlled by a switch, is connected to the motor 330 by conductors 364 and 366. An auxiliary circuit controlled by the same switch is connected by conductors 363, 365 and 367 to a micro-switch 368 positioned adjacent ferrule 370 carrying fingers 372 and 374. This micro-switch 368 is in a circuit connected to a solenoid 234, see Figs. 1 and 3, which function the valve 238 (Fig. 17) in the ice cream nozzle assembly 216. This micro-switch, schematically shown only, closes the circuit and then opens it, the time interval permitting the nozzle at the particular pressure of the ice cream to fill whatever size container is being passed through the machine.

Applicants also show an air compressor 371 being driven from the motor 330. The output of the compressor through the line 373 is carried up to the control box whence a flexible conductor may carry the air over to a pressure-actuated nozzle which may be used instead of the solenoid-controlled nozzle. An air-actuated valve for the extrusion nozzle has operating characteristics particularly for rather hard ice cream which gives a better cutoff to the flow. Either type may be used, and in either case, the functioning of the solenoid or the air-actuated piston will be controlled from the solenoid switch 368.

The heating elements for the four sealing rollers are not shown. They are electrical and derive power through the cable 375, see Fig. 1. Each pair of heat-sealing elements 290 and 292, and 296 and 298, see Fig. 4, is in a separate circuit controlled by a separate switch 376 and 378, see Fig. 1. The control box carries indicator lights which burn when its circuit is energized.

*General description of applicants' apparatus for filling containers whose vertical cross section is not constant*

Ice cream cones and so-called Dixie cups, which are truncated cones, are received from the manufacturer in nested condition. The ice cream cones are supplied either plain or seated in a conical paper wrapper whose top may be closed over the cone after filling.

In adapting applicants' machine to either cone filling or Dixie cup filling, the container-loading station is very different. Referring to Fig. 6, applicants show a schematic side elevation of a cone-loading station. In this illustration, a magazine 54 is filled with cones 56 which are dropped into notches 58 of a loading table 60. As indicated in Fig. 7, the notches in a cone table 16' are more complete circles so that when the cones drop into them they are held by gravity. The notches are on the same centers as those for the pushup. The timing on the ice cream loading station is identical with that of the pushup machine. The wrapping station, as will appear hereinafter, can be easily modified. At the unloading station, referring to Fig. 8, the cones 56 are cammed first upwardly as shown by the cone 62 and then outwardly from the restricted mouths of the notches 58. In the case of the cones, they do not move properly down the delivery runway of the unloading station and hence a shorter runway is employed and the operator picks off the cones almost immediately after they are cammed off of the loading table.

Returning to Fig. 6, a second magazine 64 is indicated. This magazine is employed where the ice cream packer desires to buy the edible cone and the protective paper cone separately. In this arrangement, the magazine 54 is loaded with edible cones. The loading table moves from left to right. The paper cones are in the magazine 64. The paper cone is first dropped into the loading table 16', followed by the edible cone. The paper cone is taller and its upper ends are ultimately heat sealed. The two magazines 54 and 64 are held in a bracket which extends down to the top 12 of the housing 10 and are mounted on the same bolts as those that hold the pushup feed assemblage shown in Fig. 10. The dropping of each cone is performed by a latch electrically controlled, which is in a circuit functioned by the micro-switch 368.

The filling of Dixie cups requires equipment very similar to that for the ice cream cones. The Dixie cups are received nested and they are delivered by electrically controlled means from vertically positioned magazines. The notches in the loading table must be of a size to accommodate the Dixie cup, but being conical they seat in the notches very similar to that for the ice cream cones. The ice cream filling station is changed only to the extent that the ice cream nozzle may be lowered. At the present time, Dixie cups are generally closed with a cardboard lid. At the sealing station, there will be mounted a standard Dixie cup lid capper. A Dixie capper, however, requires a firm base for the Dixie cup. In Fig. 9, which is a schematic side elevation of a Dixie capper, it will be seen that the Dixie cups depend below the loading table 16. The capping station carries a smooth horizontal plate 70 which is so positioned beneath the edge of the loading table 16' that as the Dixie cups reach the plate 70, they are cammed upwardly and rest upon it. In this position, the capper 72, schematically shown, can apply the lids properly. The unloading station is very similar to that of the cone apparatus. The Dixie cups are first cammed out of the socket and they push each other into the runway of the unloader.

It will thus be seen that applicants' machine has a very universal application for filling various types of set-up containers.

*Method and apparatus for loading cartons*

The container loader is centered upon the thought of inserting a complete row or battery of containers into the loader at one time, and then feeding the containers into the notches or other holding means on the loading table by pressing them against the circumferential edge of that table. Inasmuch as each notch extends inwardly of the table for less than the diameter of a container, only one container is pushed into a notch at one time. The loading mechanism mounted on the machine will be described first and then a tool for picking up a battery of containers will be described.

Referring to Figs. 10, 11 and 12, a base 80 is a casting which is mounted at one end by nuts and bolts 82 and 84 on the top 12 of the housing 10. Journaled in the left-hand end of this casting is a shaft 88, the lower end of which carries a coupling for vertically removably engaging a complementary coupling on the vertical shaft 30 extending upwardly from the housing. Non-rotatably mounted on the upper end of shaft 88 is a pulley 90. Vertically journaled in the outer end of the casting 80 is a second shaft 92, upon the upper end of which is disposed a freely rotatable pulley 94.

Intermediate the pulleys 90 and 94 are two idler or tension pulleys 96 and 98. These are mounted on brackets such as 100, see Fig. 12, which carry a guideway 102 which may slide along a bolt 104. Entrained over all four pulleys in the manner illustrated in Fig. 12 is a flat surfaced belt 106. The belt is maintained taut by counter-movement adjustment of the pulleys 96 and 98. Two flat steel strips 167 and 169, Fig. 12, are positioned adjacent the inside surface of the long flights of the belt to maintain a firm frictional contact between the belt and the containers.

Vertically mounted above the casting 80 are two posts 116 and 118. Horizontally disposed near the base of these posts are the rods 120 and 122 to the upper surface of each end of which is welded a U-shaped, horizontally disposed support rail 124. This support rail is spaced horizontally from the vertical plane of the outside of the belt 106 by a distance somewhat less than the radius of any type of container having a downwardly projected stick sought to be loaded. This spacing can be seen at the numeral 126 at the right end of Fig. 11. This spacing permits the loading of stick-bearing containers from the outside of the rail 124. In the case of containers that lack sticks but which have constant vertical cross sections such as pint and quart cylindrical containers, the rail is centered under the container, or two rails may be employed.

In the upper part of the posts 116 and 118 are disposed transverse rods 108 and 110. Mounted on the ends of the rods 108 and 110 is a U-shaped, horizontally disposed, inside guide rail 128 whose outer edge is just inside the vertical plane of the outside edge of the belt. This inside guide rail 128 has a lead curve 130, and then extends along the outer flight of the belt curving around at 132 and follows the inside flight of the belt with a curved leading end directed toward the loading table 16. The support rail 124 has a parallel curved end 136. Above and parallel to the flight of the belt, an inside rail 134 is supported on the end of the cross bars 108 and 110. These bars 108 and 110 at the point where they hold the inside rail 134 are bent upwardly to form downwardly directed U-shaped arms 138 and 140, see also Fig. 10. Welded to the inside of the rail 128 at 142 is an inverted downwardly directed U-shaped member 144. On the lower outside ends of the members 138, 140 and 144 are outside guide rails 146 and 147 which are spaced from the inside guide rail 128 by a distance only slightly greater than the diameter of the cylindrical containers. The delivery ends such as 148 of these outer rails, see Fig. 12, adjacent to the circumference of the loading table are extended so that the rails will press the containers firmly into the notches in the table. In this Fig. 12, the depth of the notches is clearly seen and it will be observed that the pushups only slightly clear the peripheral edge of the table 16. The circumferential surface 150 of the loading table is smooth so that the containers will slide easily along its surface.

Depending from the casting 80 are arms 152 and 153 on the lower ends of which is pivoted a shaft 154, see Fig. 11. Mounted on the left-hand end of this shaft 154 and keyed to it is a handle 156, the outer end of which carries a knob 158. Rigidly fastened to the rod 154 are two spaced arms 160 and 162, the upper ends of which carry a transverse positioning bar 164. This bar 164 extends from the outwardly flared end 166 of the outer guide rail 146 to the left-hand end of the feed mechanism and its inside edge is spaced from the inside guide rail 134 by a distance slightly greater than the inside diameter or dimension of the container to be loaded.

A spring 168 urges the positioning rail 164 into the position shown in Fig. 12. By depressing the handle 158, the positioning rail 164 is moved outwardly and downwardly out of the way so that a plurality of containers may be inserted laterally into the loading station and rested on the base rail 124.

The long belt flights slide over flat side surfaced rails 167 and 169 so that they will constantly engage the pushups.

The operation of the feed mechanism requires no detailed description excepting to mention the fact that the belt 106 moves at a linear speed exceeding the linear speed of the circumference of the loading table 16. The purpose of this excess speed is twofold. Firstly, the slipping of the belt along the side surfaces of the containers in the delivery side of the giudeway provides a steady pressure which assists the containers in being deeply seated in each notch of the loading table. The containers are snapped into the notches. Secondary, the belt advances the containers from the loading station rapidly until they come into contact with the containers in the delivery side of the guideway. Thus, supposing that the machine is operating at 100 pushups a minute, the containers are being picked up by the notches on the loading table 16 at the rate of almost two a second. The capacity of the guideway from the delivery point adjacent the edge of the loading table to the point 170 which is the delivery end of the loading portion of the assemblage, see Fig. 12, is approximately 18, so that in about eleven seconds, all of the containers in this portion of the guideway will have been carried off by the loading table. As will be explained in a moment, the loading station is filled by the operator will twelve or thirteen pushups at one time and if it takes him two or three seconds to insert the load, there will be a substantial space between the last container being pushed by the belt and the lead container at the loading station. This can be seen in Fig. 1, where the machine is operating and the operator is about to release into the loading station thirteen pushups. It is necessary for these pushups to promptly catch up to the pushups in the delivery side of the guideway. This is accomplished by the fast moving belt. So long as the containers meet little resistance, the containers move along the outer guide rails 146 and 147 at substantially the speed of the belt. Referring to Fig. 12, the belt causes each container to move clockwise as indicated by the arrow 73. The other edge of the container engages the rail 146 and the cylindrical pushups simply roll until they engage the line of pushups pressed against the loading table. It is evident that the belt drive engaging one side only of a container is particularly efficient in moving cylindrical containers.

*The loading gun*

The success of applicants' machine is due in no small part to the idea of removing a battery of erected containers from the shipping carton in the exact rows as received from the carton manufacturer. This feature has application only to those containers which are in erected form and are non-nestable. This excludes all conical containers such as ice cream cones and Dixie cups, and all containers received in flat form for passing through an erecting machine associated with an ice cream filler. Pushups and cylindrical ice cream containers are the common erected, non-nested containers used in large quantities in the ice cream business today. The pushups are received in a large box, and they lie in horizontal aligned rows such as illustrated in Fig. 1. The rows contain alternatively twelve pushups and thirteen pushups. Applicants provide a loading gun which is pushed downwardly onto the top row and picks up twelve (or thirteen) containers with one press. The operator then turns, as shown in Fig. 1, and inserts the entire twelve into the loading station, and returns to the box 36 for the next row. The next lower row will contain thirteen and a loading gun has a device for picking up the thirteenth pushup in alignment with the other twelve. In ice cream filling, it is important that operation continue at a constant speed and without interruption because the temperature which controls the viscosity of the ice cream mix is adjusted for continuous flow. A stop of the machine requires extrusion of the ice cream from the nozzle for a few moments to refill the pipes with ice cream of the correct consistency.

The loading gun is shown in Figs. 13, 14 and 15. It consists of a T-channel 174 with a gun-type handle 176 mounted on the web side of the channel. Mounted in two rows along the outer surface of the channel 174 are U-shaped clips such as 180 and 182. There are six clips in each row and they are staggered. The clips are made of spring steel with their ends flared outwardly, the ends being spaced from each other by slightly less than the diameter of a pushup. Referring to Fig. 13, two pushups 184 and 186 are shown as they lie in the container 36 of Fig. 1. The two ends 188 and 190 of the clip 192 can be pushed between the pushups 184 and 186. The clip 192 clasps the pushup 186 and the clip 194 clasps the pushup 184. Basically, the gun amounts to simply the foregoing. Where containers are packed in a box with the axes of each row lying in a single plane, the gun thus far described is all that is needed.

However, pushups are not so packed. In one row, there will be thirteen, and in the next row twelve, with the sticks of one row lying between the containers in the second row, which makes it necessary that the gun be able to pick up either twelve or thirteen containers at one time. To effect this, applicants have mounted on the upper portion of the web side of the T-channel 174, two brackets 196 and 198 which form, referring to Fig. 15, a rectangular guideway in which slides a flat bar 200. The upper end of the T-channel 178 is cut away back to the bracket 196. The outer surface of the bar 200 carries a stop plate 202 upon which is mounted a clip 204. The outermost clip on the upper side of the T-channel 178 is 182, while the outermost clip on the lower part of the T-channel 178 is 180. The bar 200 carries a finger arm 210 which, when it abuts the inner edge of the bracket 196, holds the clip 204 in proper relationship to the next clip 180. By moving the bar 200 to the right by means of the finger 210, the stop 202 will engage the bracket 196 and hold the clip 204 in vertical alignment with the clip 180. When the operator is about to pick up a row of twelve pushups he retracts the finger arm to the dotted position 212, which brings the clips 204 and 180 into vertical alignment as viewed in Fig. 13 and presses the clips into the row. This means that the left-hand pushup is clasped by two clips. When the operator wishes to pick up thirteen pushups, he moves the finger 210 to the left into the solid-line position.

Referring to Fig. 1, he presses down the handle arm 156 which draws down the positioning bar 164 and seats the row of pushups with the bottoms resting on the support rail 124, with the sticks 214 depending below. He then raises the handle arm 156 into the position shown in Figs. 11 and 12, and while holding it there, pulls away the loading gun 176. All of the pushups are released at one time into the loading station where the belt promptly picks them up and quickly carries them around until they engage the last preceding pushup moving toward the loading table.

Applicants are experimenting with a gun which substitutes substantially rigid U-shaped brackets for the clips. The spacing of the arms of the U is slightly less than the diameter of the pushups so that purchase is obtained by slightly deforming them. They are held in the same manner as the notches in the loading table 16 hold the pushups.

The ice cream filling station

The ice cream filling station is not shown in great detail because with the exception of its mounting and an improved nozzle orifice, the parts are standard. Referring to Fig. 3, a two-component C-casting supports the filling nozzle 216. The lower component 218 carries flanges for mounting on bolts extending upwardly through the top 12 of the cylindrical housing 10. Extending outwardly from the casting 218 is a shelf 220, and a slot or guideway 222 extends vertically downwardly into the casting. Into this guideway seats a slide 224 formed in the upper component casting 226 so that the upper compenent may move vertically with respect to the lower component. A threaded rod 228 rotatably anchored by any suitable means in the lower end of the casting 226 at 230 and positioned in a threaded hole through shelf 220, carries a crank 232. By turning the crank, the upper component 226 of the C-arm can be moved up and down.

On the inside face of the component 226 is mounted an electrically actuated ice cream valve assembly 234. This valve has a downwardly directed delivery orifice 236 which is positioned directly above the center of a container at the filling station. In practice, the lower end of this nozzle is just sufficiently spaced above the top edge of the container so that when the valve closes on the soft ice cream, the ice cream will have a sufficient distance to fall in order to break clean. The lower end of this valve is shown in Fig. 17, and differs from standard practice in one important respect. Referring to that figure, the bottom face 238 of the valve in closed position is substantially adjacent to the plane of the delivery orifice 236. In existing nozzles, the stem below the bottom of the valve is an inch or more in length. The ice cream accumulates in this section of stem and tends to drip. Avoidance of dripping is a factor in all ice cream equipment.

In order to prevent the weight of the dripping ice cream from lowering the pushups in the notches and thereby cause trouble at the wrapping station, two horizontal, parallel curved rails 231 and 233, see Figs. 3 and 1, are positioned beneath the path of the bottom of the pushups. The impact of the descending ice cream may press a pushup down upon these rails, but the pushups slide along them. The rails 231 and 233 are supported near either end by vertical rods such as 235 and 237, see Fig. 3, mounted on a bracket 239 which is fastened to the top 12.

The filling station has a means for keeping the apparatus clean while extruding ice cream which has not reached the proper consistency. Referring to Fig. 1, the numeral 242 indentifies a removable ice cream can which is positioned below duct 244 extending upwardly through the top 12 where it may be seen at 246. The ice cream is introduced to the filling valve at the point 248, see Fig. 3, where the nozzle 216 differs from that shown in Fig. 17. When the machine is first placed in operation, a certain amount of ice cream must be run through the line before the ice cream delivered attains the proper consistency. Where air voids and lowering the temperature of the ice cream require preliminary extrusion, the nozzle 44 drops the ice cream between the support rails 231 and 233 into the mouth 246 of the duct 244.

The wrapping station

The wrapping station constitutes the heaviest equipment mounted on the housing 10. It is removable as indicated in Fig. 4, and whatever type of wrapping is required for a particular container may be performed by removable special equipment at this station. For large containers, such as the cylindrical pints and quarts, the station will be empty as these can be hand capped. In the case of the ice cream cone nested in a paper cone, the upper edges of the paper cone extend above the top of the edible cone and the edges are pressed together in a sealing operation and then laid over the top.

The sealing equipment shown in the accompanying drawings is for the pushups.

Referring to Fig. 4, removably mounted on the table top 12 is the heavy bracket 28 which straddles the shaft 86. Mounted on the bracket 28 is a heavy plate 260 to the opposite ends of which are fastened heavy posts 262 and 264 having heavy inwardly directed arms 266 and 268. The inside edge of the plate 260 is approximately at the level of the loader table 16 and is curved and spaced therefrom so as to pass the notches of the table when loaded with pushups. Mounted between the plate 260 and the arm 266 is a main shaft 270 which is removably coupled to the shaft 86. Rigidly mounted between the posts 262 and 264 is a second plate 272 which extends rearwardly of the peripheral edge of the loader table 16. Mounted between this plate and the plate 260 is a shaft 274. In heavy bearing blocks 276, 278 and 280, mounted on top of the plate 272, are suspended two full-length shafts 282 and 284 and a shaft 286. None of these three shafts is supported at its lower end. The main shaft 270 seats through a coupling over tht stub shaft 30 and is driven thereby. Mounted on the shafts 270, 282, 286, 284 and 274 are gears forming a gear train which drives all of the shafts from the main shaft 270.

The loading table 16 moves from left to right and the main shaft 270 turns clockwise as indicated by the arrow 288. By following the lever train through, it will be seen that the shafts 276 and 284 turn counter-clockwise and the shaft 274 turns clockwise. The midpoint between the pair of shafts 270 and 276 and the pair of shafts 274 and 284 is the circle through the notches in the loading table 16 which contains the centers of the pushups and each of these pairs of shafts is on a radius of the loader table 16. These details can be seen in Fig. 16.

Mounted on the shafts 270 and 282 are heat-sealing elements 290 and 292, each of which consists of a cylinder having vertical, surface, semi-cylindrical cut-outs capable of receiving a pushup. See also Fig. 16. Associated with each heat-sealing element is an electrical heater and a source of current. These are not described in detail as their construction could assume many forms. The heat-sealing elements 290 and 292 have their lower edges at about the midpoint of the pushups such as 294, and their upper edge substantially thereabove. The arrises such as 291 and 293 of both fluted cylinders 290 and 292 are on a radius and are heated.

Mounted on the shafts 284 and 274 are band heat-sealing and crimping elements 296 and 298. Below the heat-sealing band 298 on the shaft 274 is a fluted cylinder. In each arris is a knife anvil 300. Mounted below the band heat sealer 296 on the shaft 284 is a fluted cylinder in each arris of which is positioned a vertical knife 301. As the shafts 274 and 284 rotate, referring to Fig. 16, these knives will engage the anvils and sever anything lying between them.

Mounted on the plate 260 on a flat arm 304 is a spindle 306 carrying the spool of heat-sealable material 48. Mounted on top of the shaft 14, referring to Figs. 1 and 16, is a hub 46 carrying the spool of heat-sealable material 48, see Fig. 1. The two ends of the two spools feed between the heat-sealing rolls 290 and 292 as shown in Fig. 4, and on over to the heat-sealing bands 296 and 298. In the absence of pushups in the loading table, they lie flat.

As the pushups advance into the heat-sealing station, they are fed between the two strips of heat-sealable material, which projects above them for about an inch and a half. As each passes between the heat sealers 290 and 292, a full-length vertical seal 312 is made bewteen each pair of adjacent pushups. As the pushups advance through the station, the upper edge is heat sealed by the band sealers 296 and 298, and concurrently a knife cuts the material down the heat seal so as to leave each pushup with a protective wrapper having a flap standing upright as indicated at 314.

The unloading station

As the pushups continue along the loader table, they reach the delivery station 26 where they are cammed off of the table by the rods 50 onto the track 52. The guideway 52 is mounted on the bracket 34 removably mounted on the top 12 of the housing 10.

Operation of the machine for pushups

The operator connects the ice cream freezer to the inlet 248, see Fig. 17, leaving the delivery valve on the freezer closed. Then he loads pushups into the feeding assemblage. He feeds the ends of the wax paper through the wrapping station and closes both switches to the four heating elements. Thereupon, he closes the main switch and operates the machine until he is certain that each assemblage is performing its function properly including the opening and closing of the ice cream filling valve.

Satisfied that everything is working properly, he turns off the main switch and clears the container-holding notch immediately beneath the ice cream nozzle if there is a container at that position. He then opens the valve from the ice cream freezer and extrudes ice cream into the duct, there is a manual means for holding the valve in the ice cream nozzle open. When all of the air in the ice cream line has been expelled and the proper delivery temperature and viscosity has been obtained, he closes the ice cream valve on the machine and promptly closes the main switch. At the time he closes the main switch, the container-holding notches between the feeding station and the filling station should be filled with containers and an adequate supply of containers should be in the feeding station. The empty containers in the machine are, of course, recovered and re-fed into the feeding station. There is a wastage of a small quantity of sealing paper.

The machine fills from 80 to 120 containers a minute depending upon the adjustment of the variable speed control 332, see Fig. 2.

When the machine is to be thoroughly cleaned, the feeding and the wrapping assemblages are unbolted and removed because it is not desirable to get water on either the heating elements of the wrapping assemblage or the belt of the feeding assemblage. With these two assemblages removed, the operator can use water very freely provided, of course, that he keeps the water below the control box and the actuating head on the filling station. The inverted bowl 18 keeps the water out of the mechanism inside the housing 10 and there is no appreciable leakage of water past the shaft 86 and 30 into the housing 10.

When it is desired to use the machine for filling some other kind of container, the procedure is as follows. The feeding, wrapping and delivery assemblages are removed. The loading table is replaced with a loading table carrying holding means for the particular type of container to be filled. If these containers are cones, a loading table such as 16' in Fig. 7 will be mounted on the vertical shaft 14. The loading table 16' has the same diameter as that of the table 16 and the centers of the notches in the table 16' are spaced by the same distance as the notches in the plate 16. Hence it is unnecessary to change any element controlling the timing. The operator then mounts an assemblage carrying one or two cone-carrying magazines as suggested in Fig. 6 at the feeding station and connects the electrically actuatable element for delivering a cone from a nested stack into the circuit controlled by the solenoid switch 368. There is an outlet in the control box for this purpose. If the cone is not to be closed with a wrapper, no assemblage is mounted at the wrapping station. If it is to be closed, he will mount at the wrapping station an assemblage which will bring the open conical top of the paper cone into a line above the filled edible cone and seal it, so that the cones will have much the same appearance when leaving the wrapping station as that of the pushups shown in Fig. 4. It is anticipated that, by removing the fluted cylinders 290, 292 and 300, leaving only the band-sealing elements 296 and 298, see Fig. 4, and not feeding in the wax paper from the rolls 48 and 46, it will be possible to use the wrapping station shown in the drawings for sealing the wax paper tops on ice cream cones.

At the delivery station, the operator will mount an assemblage very similar to that shown for pushups but whose guide rail has a downward bend immediately above the loading table, as suggested in Fig. 8. The cones will first be cammed upwardly so that the diameter of the cone at the top of the table will be less than the opening in the notches and then the cone will be cammed off through the notch opening into the guideway. The cones dip and jam in such a guideway and the operator will remove the cones immediately after they are withdrawn from the notches on the loading table.

Where the machine is to be used for containers of greater diameter than pushups and cones, i.e., Dixie cups or cylindrical pints and quarts, the operator after removing the loading table will remove the cam 344, see Fig. 2, and replace it with a cam which will move the modified gear 346 by two teeth or three teeth. It is not believed necessary to show the cams in detail or either of these other two cams. Suffice it to say, each loading table has the holding elements spaced on centers which are uniform around the table but which are multiples of 12 degrees. In the case of a quart container, it is possible to provide ten notches around a table of the same diameter as that shown in the drawings. These notches will be spaced from each other on 36-degree centers and the cam used will turn the table by 36 degrees each time. The relationship of the cam shaft 342 to the main shaft 14 is one 360-degree turn for 12-degree, 24-degree or 36-degree turns of the shaft 14, depending upon the cam used. With the new cam and table in position, it is necessary to replace the ferrule 370 with one whose pins 372 and 374 will permit the ice cream delivery valve to be open for a much longer period of time. Additionally, it will be appreciated that the speed control 332 will be adjusted to turn the table much more slowly. With the same nozzle at the filling station, there must be a substantially greater period of time allowed for flowing ice cream to fill a quart container. If the speed were not reduced, the machine would fill 120 quart containers per minute, provided the ice cream freezer and the nozzle could deliver such quantities of ice cream. They cannot do this and hence, the speed of the machine must be greatly cut down.

When the machine is being used for filling pint or quart size containers, the wrapping station will probably be vacant. Such containers are manually capped at the present time and a single operator can cap ten to twenty containers per minute without difficulty. Where such large containers are being filled, there will be a continuous support rail similar to that shown under the filling station in Fig. 3 beneath the containers. A delivery assemblage will not be used, the second operator being required to manually withdraw the filled container from the machine.

When it is desired to use the machine to fill Dixie cups, which are received in nested form, a feeding assemblage similar to that used with cones will be employed. The notches on the loading table will be similar to those used in the case of cones, 16' in Fig. 7, but they will be on 24-degree centers. A suitable cam will be used. Dixie cups are commonly closed with a circular, flat lid with a finger tab at one side. A Dixie cup has about the same capacity as the pushup and manual positioning of these tops at such high speeds of filling is not practical. There will be mounted at the wrapping station a Dixie cup capper electrically actuated in the same circuit as the filling nozzle.

It will thus be seen that the machine design makes it possible by the substitution of parts to fill erected containers of various sizes and shapes. The machine has great appeal to ice cream packers who have a substantial volume of pushup business. It fills pushups very rapidly with a minimum amount of labor involved, is very compact, and easy to keep clean. For the ice cream packer with a limited pushup demand but having a demand for other types of ice cream packages, he can obtain a machine which he can keep busy by the substitution of feeding and wrapping accessories which will cost much less than that of complete machines for each type of packaging.

Having thus described our invention, what we claim is:

1. An ice cream filling machine comprising an upright cylindrical base, a liquid-tight top on said base, there being a large opening through said top, a shaft projecting through said opening, a source of power within said base, a linkage drivingly connecting the vertical shaft to said source of power, a removable element for controlling rotative movement of the shaft positioned in said linkage and accessible through said opening, a cover having an opening seated over the shaft and extending over the periphery of said opening, a circular plate mounted on the upper end of said shaft, said plate having a diameter substantially less than the top of the base so as to leave exposed an annular surface of the top, container holders mounted around the periphery of said plate, and assemblages for performing various operations in connection with the containers mounted on said annular surface of the top of the base adjacent the edge of the plate.

2. An ice cream filling machine comprising an upright cylindrical base, a liquid-tight top on said base, a shaft projecting through said top, means in the base for rotating said shaft, a circular plate mounted on the upper end of said shaft, said plate having a diameter substantially less than that of the top of the base so as to leave exposed an annular surface of the top of the base, container holders mounted around the periphery of said plate, a downwardly directed ice cream nozzle mounted on said annular surface of the base and positioned above a container holder on the periphery of the plate, an open-ended duct through said annular surface of the base beneath said container holder and said nozzle and through the side wall of the base, and a catch bucket beneath the lower end of the duct.

3. A multiple purpose container filling machine comprising a frame, a flat top on said frame, a source of power mounted on said frame, a vertically disposed shaft connected to said source of power and extending upwardly through the flat top, a circular member axially mounted on said shaft above the flat top, a plurality of holding means equally spaced adjacent the circumference thereof, a second shaft connected to the source of power extending vertically through the table top and terminating at a level below that of the circular member and near its periphery, a mechanical assembly having a vertical shaft and having supports seatable on said top with the assembly shaft near said second shaft, and complementary coupling components on the adjacent ends of said second and assembly shafts which drivingly engage each other when said assembly supports are seated on said top.

References Cited in the file of this patent

UNITED STATES PATENTS

| | | |
|---|---|---|
| 751,170 | Hopkins et al. | Feb. 2, 1904 |
| 1,047,288 | Radack | Dec. 17, 1912 |
| 1,500,939 | Howell | July 8, 1924 |
| 1,551,331 | Risser | Aug. 25, 1925 |
| 1,797,379 | Spaulding | Mar. 24, 1931 |
| 1,997,351 | Tevander | Apr. 9, 1935 |
| 2,029,823 | Huntley et al. | Feb. 4, 1936 |
| 2,075,711 | Gilley | Mar. 30, 1937 |
| 2,087,809 | Nichols et al. | July 20, 1937 |
| 2,095,960 | Bach | Oct. 19, 1937 |
| 2,097,383 | Riemer | Oct. 26, 1937 |
| 2,112,486 | Francis et al. | Mar. 29, 1938 |
| 2,164,530 | Larsen | July 14, 1939 |
| 2,223,017 | Abrams et al. | Nov. 26, 1940 |
| 2,232,578 | Wetsch | Feb. 18, 1941 |
| 2,286,250 | Albertoli | June 16, 1942 |
| 2,335,239 | Gladfelder et al. | Nov. 30, 1943 |
| 2,336,962 | Salfisberg | Dec. 14, 1943 |
| 2,359,932 | Newey | Oct. 10, 1944 |
| 2,374,504 | Salfisberg | Apr. 24, 1945 |
| 2,388,804 | Schurch | Nov. 13, 1945 |
| 2,454,285 | Krueger | Nov. 23, 1948 |
| 2,540,120 | Jacobs et al. | Feb. 6, 1951 |
| 2,546,205 | Zimmerman | Mar. 27, 1951 |
| 2,597,760 | Strahm | May 20, 1952 |
| 2,656,964 | Detrez | Oct. 27, 1953 |
| 2,687,202 | Nordquist et al. | Aug. 24, 1954 |
| 2,700,494 | Kummer et al. | Jan. 25, 1955 |